United States Patent
Duffield et al.

(10) Patent No.: US 7,356,848 B1
(45) Date of Patent: Apr. 8, 2008

(54) SYSTEM AND METHOD OF VERIFYING AUTHORIZATION FOR COMMUNICATING PROTECTED CONTENT

(75) Inventors: David Jay Duffield, Indianapolis, IN (US); Michael Scott Deiss, Zionsville, IN (US)

(73) Assignee: Thomson Licensing, Boulogne Billancourt (FR)

(*) Notice: Subject to any disclaimer, the term of this patent is extended or adjusted under 35 U.S.C. 154(b) by 856 days.

(21) Appl. No.: 10/089,905

(22) PCT Filed: Oct. 19, 2000

(86) PCT No.: PCT/US00/28942

§ 371 (c)(1),
(2), (4) Date: Apr. 3, 2002

(87) PCT Pub. No.: WO01/30083

PCT Pub. Date: Apr. 26, 2001

Related U.S. Application Data

(60) Provisional application No. 60/160,355, filed on Oct. 19, 1999.

(51) Int. Cl.
 *G06F 21/00* (2006.01)
(52) U.S. Cl. ...................................... 726/29

(58) Field of Classification Search .............. 380/201, 380/200; 726/4, 5, 29
See application file for complete search history.

(56) References Cited

U.S. PATENT DOCUMENTS

| | | | | |
|---|---|---|---|---|
| 5,420,866 | A | 5/1995 | Wasilewski | 370/110.1 |
| 5,941,953 | A * | 8/1999 | Bergmann et al. | 709/234 |
| 6,466,971 | B1 * | 10/2002 | Humpleman et al. | 709/220 |
| 6,490,355 | B1 * | 12/2002 | Epstein | 380/203 |
| 6,671,803 | B1 * | 12/2003 | Pasieka | 713/156 |
| 6,731,758 | B1 * | 5/2004 | Graunke et al. | 380/239 |

FOREIGN PATENT DOCUMENTS

| | | |
|---|---|---|
| EP | 0858184 | 8/1998 |
| WO | 99/07150 | 2/1999 |
| WO | 99/22372 | 5/1999 |
| WO | 00/56068 | 9/2000 |

OTHER PUBLICATIONS

"Functional Model of a Conditional Access System", EBU Review-Technical, European Broadcasting Union, pp. 64-77.

* cited by examiner

*Primary Examiner*—Kambiz Zand
*Assistant Examiner*—Andrew L Nalven
(74) *Attorney, Agent, or Firm*—Joseph J. Laks; Paul P. Kiel

(57) ABSTRACT

A method for verifying that a source device is authorized to communicate otherwise protected content to a sink device in a conditional access system using identification codes.

19 Claims, 2 Drawing Sheets

SYSTEM AND METHOD OF VERIFYING AUTHORIZATION FOR COMMUNICATING PROTECTED CONTENT

This application claims the benefit under 35 U.S.C. § 365 of International Application PCT/US00/28942, filed Oct. 19, 2000, which was published in accordance with PCT Article 21(2) on Apr. 26, 2001 in English; and which claims benefit of U.S. provisional application Ser. No. 60/160,355 filed Oct. 19, 1999.

FIELD OF INVENTION

The present invention relates generally to digital audio/video transmission systems, and more particularly to a method and system for authenticating access to otherwise protected content.

BACKGROUND OF INVENTION

Extended Conditional Access (XCA) is a system for protecting digital encoded audio/video (A/V) content during transmission and storage. Under the XCA system, content of economic value is scrambled, or encrypted, to prevent unauthorized access. XCA allows recording of scrambled content, but does not permit descrambling of content that is not legitimate. Legitimate content is that which is an original or otherwise authorized by the copyright owner, for example. Of course, descrambling refers to the process of decryption. Since non-legitimate content is not descrambled, it cannot be viewed.

A distinct characteristic of the XCA architecture is the notion of conditional access (CA) and local protection. CA specifies access to protected content, such as programming. Removable security devices perform security related functions. Content of economic value is delivered using a CA service. For example, digital satellite systems scramble video content and the descrambling keys for mass distribution to their subscribers. Some subscribers may decide to purchase the content in which case they are supplied with the necessary keys to recover/obtain the descrambling key. Those subscribers choosing not to purchase the content are not provided access to these keys. In XCA terminology, this is the process of CA.

XCA systems use a return channel to receive authentication of the local keys and identities that are used for accessing content. This creates a problem in that most devices need to have a return path method of some sort to make this work.

An improved method for authenticating keys and identifiers used to access otherwise protected content in XCA and other systems which exhibit conditional access is desirable.

SUMMARY OF INVENTION

A method for verifying that a source device is authorized to communicate otherwise protected content (e.g. scrambled services) to a sink device in a conditional access system, the method including: providing substantially unique identifiers associated with the source and sink devices to a validation authority. The validation authority determines an approval code using data associated with the source and sink devices, the data corresponding to the communicated identifiers; and, the source device determines a local code using the data associated with the source and sink devices, and compares at least a portion of the approval code to at least a portion of the local code for verifying the source device is authorized to communicate the content to the sink device.

DETAILED DESCRIPTION OF THE INVENTION

According to the present invention, an owner, or user or operator of devices in an XCA system is used as part of a viable return path. A major problem, however, is encountered when utilizing an operator of a device as a return channel. A user cannot be expected to read or enter a 768-bit number accurately. However, large numbers are needed to prevent brute-force cryptanalysis attacks, i.e. trying every possible signature until one works. The problem is verifying that the message, e.g. public key, received is valid. Certificates or signatures used to do this are typically at least 20 bytes in length, and are usually closer to 100 bytes. The signature must have enough possible values to make a brute force attack infeasible. According to the invention, the same goal is accomplished with a much smaller key space by limiting what resources can be used to make a brute force attack.

Figure 1:
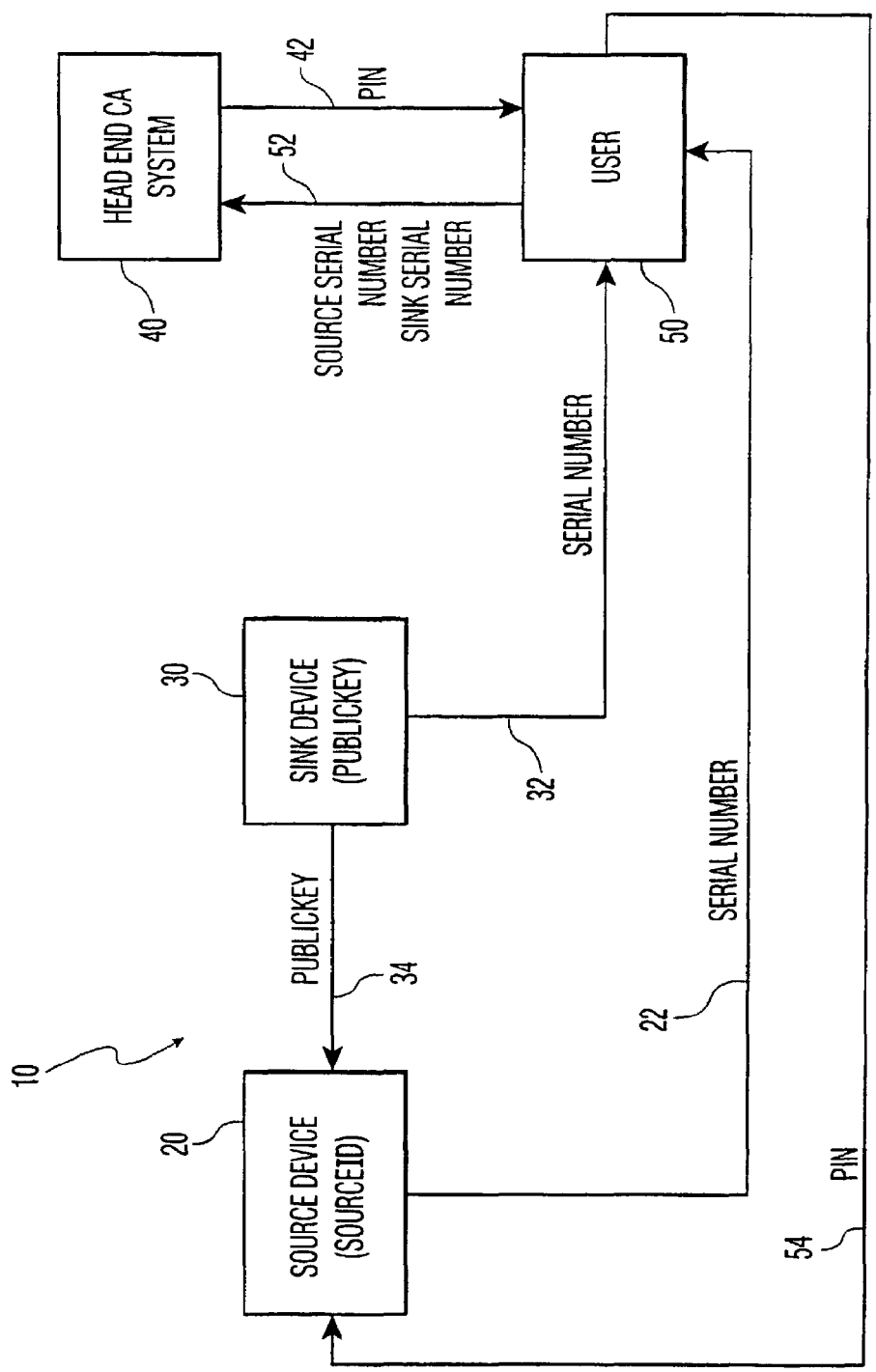
FIG. 1 illustrates a system according to one aspect of the present invention; and, FIG. 2 illustrates a system according to a second aspect of the present invention.

FIG. 1 illustrates a system 10 for authenticating access to otherwise protected content. The system 10 includes a source device 20 having an associated identifier (SOURCEID), a sink device having an associated digital key (PUBLICKEY), a user or operator 50 of the source device 20, and a head end CA, or Trusted Third Party (TTP), system 40.

The source device 20 can take the form of an access device such as a satellite set-top box (STB) or media player, such as digital video cassette (DVHS) player or digital versatile disc (DVD) player, while the sink device can take the form of a digital television (DTV). According to another aspect of the invention both the source device 20 and sink device 30 have publicly accessible serial numbers.

Generally, in order to protect the transmission of content from source device 20 to sink device 30 such that it cannot be illicitly reproduced or otherwise improperly used, the PUBLICKEY of sink device 30 is communicated to source device 20. Content provided to by source device 20 is scrambled using the PUBLICKEY of sink device 30, and transmitted to sink device 30 in scrambled form. The sink device 30 uses the corresponding private key, to unscramble the content and to enable its proper display by the sink device 30. It should also be realized that the above may be accomplished using a two stage process wherein the content is scrambled using a symmetric algorithm, and the control word for this scrambling is sent using the PUBLICKEY.

The PUBLICKEY and SOURCEID of the sink and source devices 30, 20, respectively, are determined by the TTP using the serial numbers of these devices. The determined PUBLICKEY and SOURCEID are then separately used by the devices 20, 30 and TTP to authenticate that the devices 20, 30 may operate in combination to access the content.

The user 50 obtains the serial numbers from the respective source and sink devices 20, 30 (for example, by reading them off the devices) and calls the head end CA system to enable use of the source and sink devices 20, 30 in combination. The user 50 provides these serial numbers to the head end CA system 40 as communication 52. These serial numbers can be provided in a voice communication or electronically, or acoustically for example. The Head End CA system 40 has access to a database that converts the provided serial numbers to SOURCEID and PUBLICKEY data. Hence, the head end CA system 40 can identify the SOURCEID and PUBLICKEY data of the source device 20 and sink device 30 from these communicated serial numbers, e.g. by using a lookup. According to another aspect of the present invention, it is important that the relationship between the serial numbers and SOURCEID is not public, and not readily ascertainable.

In FIG. 1, the head end CA system 40 computes a hash code of these two values, e.g. the SOURCEID and PUBLICKEY as an approval hash calculation, and provides it to the user 50 as a Personal Identification Number (PIN) (illustrated as communication 42). The user 50 then enters this PIN into the source device 20 (illustrated as communication 54), which has computed the same hash, e.g., as a local hash calculation using the SOURCEID resident in the source device 20 and PUBLICKEY provided by the sink device 30 (illustrated as communication 34). If the PIN matches the hash, then the source device 20 recognizes that the PUBLICKEY provided in communication 34 from the sink device 30 is valid for use, that the head end CA system 40 has been given this key, and that the head end CA system 40 approves it for use such that the source device 20 and sink device 30 are authorized to operate in combination with one another.

According to another aspect of the present invention, and as set forth, either the SOURCEID and/or the algorithm for computing the hash is kept secret. As will be understood by those possessing an ordinary skill in the pertinent art, the fact that a potential pirate does not have this input to the hash function effectively prevents a brute force attack with a more powerful computer.

According to another aspect of the present invention, the PIN code has a large enough space that an exhaustive search for a valid signature takes prohibitively long. One way of accomplishing this is to have the source device 20 take a significant time to approve the PIN code, either with a complex calculation, or with a waiting period after the computation, for example. A suggested value for this application, e.g., copy protection for a home A/V network, could be a 9 or 10 digit PIN, and a compute time of one second. This would force an average exhaustive search time of $5 \times 10^8$ or $5 \times 10^9$ seconds, or approximately 16 or 160 years.

According to an alternative aspect of the present invention, another input to the hash function can be a title code or media, such as a tape or DVD, serial number. This allows for individual titles or tapes to be approved or disapproved for use, for example. One can accomplish significant time savings by storing the serial numbers for a given user 50 in the head end CA system 40 so that the user 50 does not have to provide them for each transaction.

According to another alternative aspect of the present invention, another input to the hash function can be indicative of total running time or elapsed time since the first approval. This allows the approval to automatically expire after a set time or usage. If an extra time code is needed, this can be signaled from the source device 20 to the user 50. The time codes should be sufficiently random such that the user 50 cannot effectively guess or otherwise predict what the next time code will be. If the user 50 were capable of doing this, he could call in beforehand, and essentially pre-authorize his system by getting the PIN codes before they were required.

According to yet another alternative aspect of the present invention, another PIN code based system is based on balkanizing or dividing the key space of local networks into smaller segments without going to the security extreme of using unique per-network keys.

Figure 2:
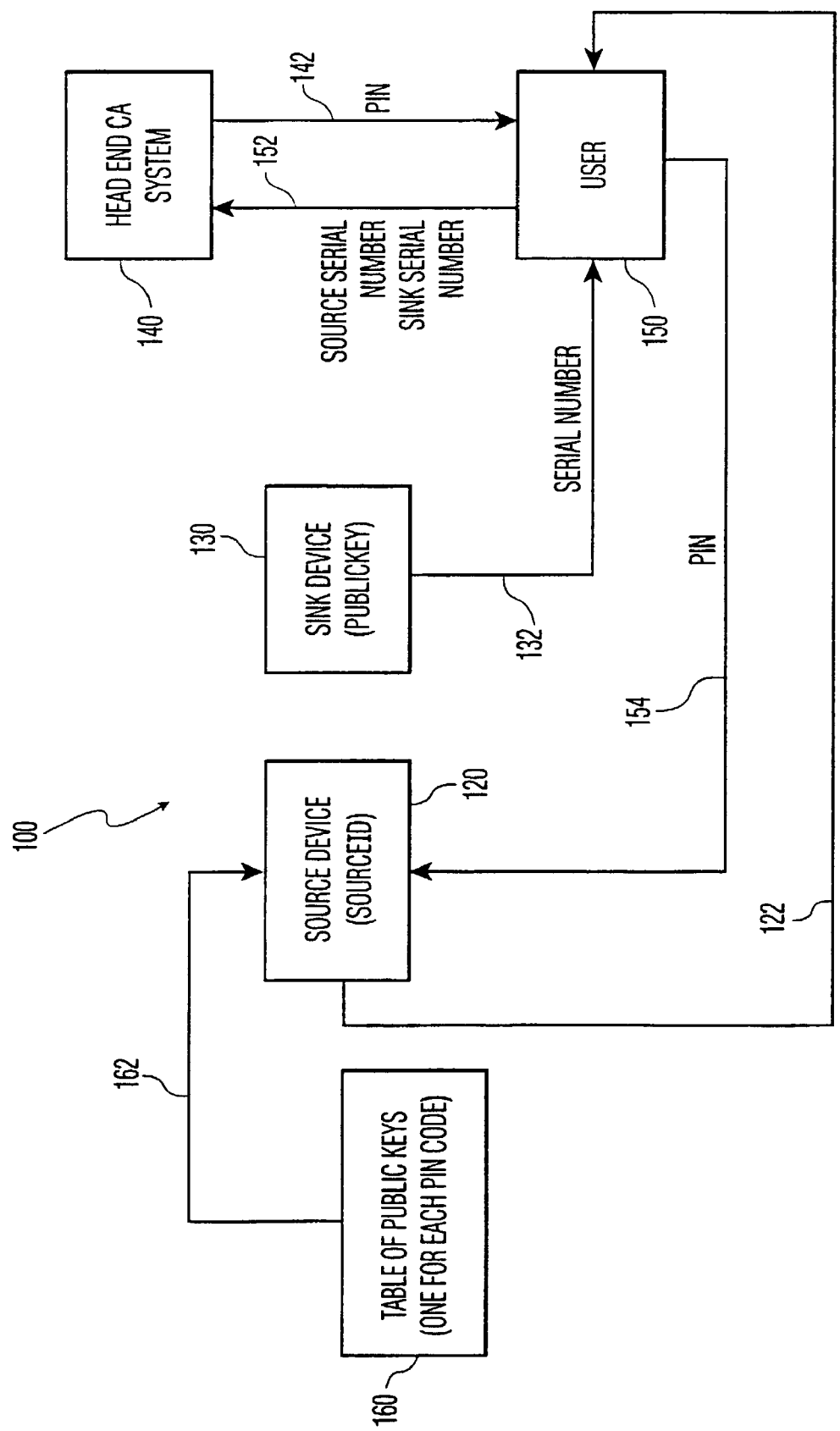

FIG. 2 illustrates another system 100 suitable for authenticating keys and identifiers used to access otherwise protected content. The system 100 includes a source device 120 having an associated SOURCEID, a sink device 130 having an associated PUBLICKEY, a user, or operator 150 of the source device 120 and a head end CA system 140.

Sink devices can be made with a relatively small number of private keys, 10,000 for example. The user 150 reads the serial numbers of the sink device 130 and source device 120 (illustrated as communication 132, 122 respectively). The user 150 then calls into the head end CA system 140, provides the serial number of the sink device 130 and source device 120, and receives the PIN code for this sink device 130 (illustrated as communications 152, 142). The PIN code can be determined via a lookup table or appropriate calculation. The user 150 then enters this PIN code into the source device 120 (illustrated as communication 154), and the source device 120 indexes to the correct public key to use for the sink device 130 using a table of public keys 160.

The table of public keys 160 is large compared to the storage of the source device 120 itself. Table 160 is encrypted, and stored at the beginning of prerecorded media (for example, tapes). This provides an easy mechanism for obtaining the public key (PUBLICKEY) when needed, as any prerecorded tape may be used to initialize the network. After that, the system 100 will work on it's own, as the source device 120 will remember the proper key or use with the sink device 130.

Prerecorded media such as tapes are conventionally encrypted with some other, stronger encryption system. In the present invention, only the digital link from source device 120 to sink device 130 is encrypted with this weaker local key. While the local key is not unique to this network, it will be very difficult to profitably make copies of material if 10,000 different versions of the tape are required for each title.

In the event that one of the 10,000 local keys of the above-described system 100 becomes known, "pirate" users might continually use the same PIN code to allow content to be played using any source device 120. System 100 may be improved by making the PIN code a hash function of the SOURCEID, as well as the index into the table of public keys 160. This forces the user 50 to obtain a unique PIN for each source device 120. If an overwhelming number of requests come in for a given public key in the index table 160, then that can be used as a signal that a private key has been compromised.

The invention claimed is:

1. A method for verifying that a source device that is capable of receiving protected content is authorized to communicate the protected content to a sink device that is capable of descrambling the protected content comprising:
   receiving at said source device an approval code associated with said source and sink devices, the approval code being determined using identifiers uniquely associated with said source and sink devices;
   determining, in said source device, a local code using data associated with said source and sink devices, the local code being determined using data from said sink device and a source identifier prestored in said source device; and comparing, in said source device, at least a portion of said approval code to at least a portion of said local code, verifying that the sink device is authorized to receive the protected content from said source device in response to the comparison, and providing access to the protected content to the sink device in response to the verifying step.

2. The method according to claim 1, wherein said approval code and local code are determined based on a hash calculation.

3. The method according to claim 2, wherein said data associated with said source device for determining said local code is not public information and wherein said data associated with said sink device for determining said local code is public information.

4. The method of claim 2, wherein said identifiers are serial numbers or other identification codes accessible to a user, and wherein said data from said sink device used in said hash calculation is a public key.

5. The method of claim 1, further comprising said source device communicating whether said source device is authorized to provide said content to said sink device to a user, and delaying communicating whether or not said compared approval code and local code are consistent.

6. A method for verifying that a source device that is capable of receiving protected content is authorized to communicate protected content to a sink device that is capable of descrambling the protected content comprising:
    providing unique identifiers associated with said source and sink devices to a validation authority
    receiving, by a user, from said validation authority an approval code, said approval code using data corresponding to said identifiers, said user providing said approval code to said source device;
    determining, in said source device, a local code using said data associated with said source and sink devices, and
    comparing at least a portion of said approval code to at least a portion of said local code, verifying that the sink device is authorized to receive the protected content from the source device in response to the comparison, and providing access to the protected content to the sink device in response to the verifying step.

7. The method of claim 6, wherein said unique identifiers are provided to said validation authority by said user.

8. The method of claim 6, wherein said source device is selected from one of an access device and a media player and wherein said sink device is a digital television.

9. The method of claim 6, wherein said data associated with said source device is secured so as not to be readily ascertainable by said user.

10. The method of claim 6, wherein said data associated with said source and sink devices comprises a unique identification indicative of said source device and a public encryption key associated with said sink device.

11. The method of claim 10, wherein said unique identification indicative of said source device is secured from a user of said source device.

12. A method for verifying that a selected device is authorized to receive protected content and for selecting at least one security key and at least one identifier used to access protected content, said method comprising:
    receiving at a first device a plurality of security keys associated with said content;
    receiving said identifier at said first device to be used to provide said content to a second device, said identifier being associated with said second device;
    comparing said identifier with said plurality of security keys and verifying that said second device is authorized to receive said protected content in response to the comparison, and selecting one of said plurality of security keys associated with said identifier using said first device, wherein said plurality of security keys are indexed in a table of keys and said identifier is the index of said select key in the table of keys and a result of a hash function of said identifier; and,
    providing said content to said second device using said first device and selected security key in response to verifying that said second device is authorized to receive said protected content.

13. The method according to claim 12, comprising providing a serial identification indicative of said second device for accessing said content to a validation authority.

14. The method according to claim 13, further comprising determining an identifier associated with said second device using said serial identification.

15. A method for verifying that a source device, having an associated unique identifier and serial number and a sink device having a unique key and serial number should have access to content by using a validation authority, wherein said unique identifier is secured by a user of said source device, said method comprising:
    providing said serial numbers to said validation authority;
    said validation authority determining said unique identifier using said serial numbers; and, if said access to said content is authorized,
    said validation authority determining an authorization identifier using said unique identifier, said validation authority providing said at least portion of said authorization identification to a user, and said user providing said authorization identification to said source device,
    said source device determining a local identifier using said unique identifier; and,
    verifying said source device and sink device are authorized to have access to content if said authorization identifier and local identifier correspond to one another, and providing access to the protected content to the sink device in response to the verifying step.

16. A method for verifying that a set top box is authorized to communicate protected content to a digital television comprising:
    receiving at said set top box a user entered approval code associated with said set top box and said digital television, said user receiving the approval code from a validation authority, the approval code being determined using identifiers associated with the set top box and the digital television;
    determining, in said set top box, a local code using data associated with said set top box and said digital television; and
    comparing at least a portion of said approval code to at least a portion of said local code, verifying that said digital television is authorized to receive said protected content from said set top box in response to the comparison, and providing access to the protected content to the digital television in response to the verifying step.

17. The method of claim 16, wherein the approval code is generated using the respective serial numbers of the set top box and the digital television.

18. A method for verifying that a digital video recorder is authorized to communicate protected content to a digital television comprising:

receiving at said digital video recorder a user entered approval code associated with digital video recorder and said digital television, said user receiving the approval code from a validation authority, the approval code being determined using identifiers associated with the digital video recorder and the digital television;

determining, in said digital video recorder, a local code using data associated with said digital video recorder and said digital television; and comparing at least a portion of said approval code to at least a portion of said local code, verifying that said digital television is authorized to receive said protected content from said digital video recorder in response to the comparison, and providing access to the protected content to the digital television in response to the verifying step.

19. The method of claim 18, wherein the approval code is generated using the respective serial numbers of the digital video recorder and the digital television.

* * * * *